United States Patent Office 3,368,995
Patented Feb. 13, 1968

3,368,995
FIBERGLASS REINFORCED POLYETHYLENE TEREPHTHALATE
Takashi Furukawa, Tokyo, and Takeshi Kamiya and Atsumi Nakamura, Sagamihara-shi, Japan, assignors to Teijin Limited, Osaka, Japan, a corporation of Japan
Filed Oct. 22, 1965, Ser. No. 502,648
Claims priority, application Japan, Aug. 3, 1965, 40/47,059; Sept. 28, 1965, 40/59,356; Sept. 30, 1965, 40/60,036; Oct. 8, 1965, 40/61,719
6 Claims. (Cl. 260—40)

ABSTRACT OF THE DISCLOSURE

A reinforced polyethylene terephthalate composition for molding use and a molded article produced therefrom, said composition comprising polyethylene terephthalate resin, glass fibers of an average length of greater than 0.4 mm. in an amount of from 10% to 50% by weight based on the composition, and at least one nucleating agent in an amount of at least 0.1% by weight based on said polyethylene terephthalate resin. Also, a process for molding articles of such reinforced polyethylene terephthalate which comprises molding the reinforced composition at a temperature of from 120° C. to 200° C. or molding and thereafter heating the resultant molded article at such a temperature.

---

Figure 1:
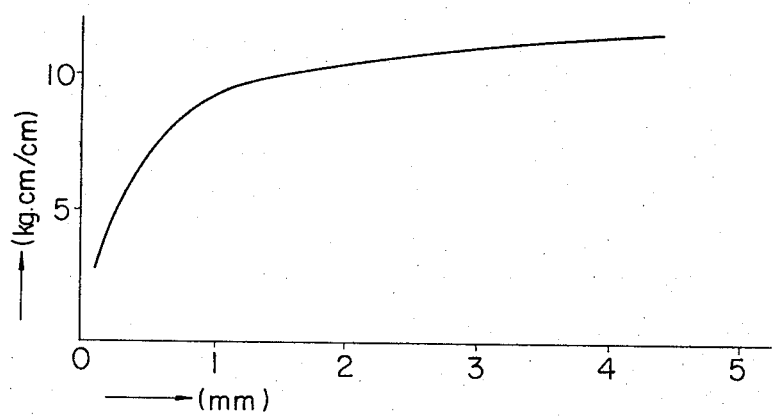

This invention relates to molded articles of reinforced polyethylene terephthalate and a method of producing the same.

Polyethylene terephthalate is being widely used for fibers and films in view of its high second order transition point and softening point and low melt viscosity. On the other hand, when it is molded into articles having thickness such as pipes, rods, boards and the like, the appearance and properties of the article tend to become nonuniform owing to its high crystallinity and high crystallization temperature, and in addition, since its shock resistance and heat resistance are inferior, the article is not serviceable.

For reducing the crystallinity without lowering the second order transition point and softening point, researches have been made of copolymerizing a third component with the polyethylene terephthalate. However, no improvement in either the shock resistance or heat resistance has been observed in these copolymers, and hence they are hardly used for molded articles as yet.

On the other hand, the reinforcement of such thermoplastic resins as nylon, polystyrene and polycarbonate with glass fibers is being practiced. For example, in the case of nylon, while there are observed improvements in the dimensional stability, moisture absorption and strength, improvement in its shock resistance is rarely observed. Again, in the case of polycarbonate, while there are observed improvements in the dimensional stability and strength, the shock resistance, rather than being improved, declines. Further, neither is there seen any improvement in the shock resistance of polystyrene, which is especially inferior in this property.

As is apparent from these instances, the reinforcement of a resin by means of glass fibers brings about results that are unexpected depending on the kind of resin. When it is attempted to improve on properties which the resin is deficient in, either the desirable properties are degraded or the desirable properties cannot be improved any further, and hence it is difficult to predict the desired improvement effects.

Polyethylene terephthalate, as hereinbefore noted, has not been used for thick molded articles nor has there been any attempts to reinforce it with glass fibers. The reason for this was that it was technical common sense to regard it as being unsuitable for such molded articles as pipes, rods, boards and the like in view of its tendency to become nonuniform owing to its crystallinity and its inferior shock and heat resistances.

As a result of having engaged in extensive researches for a method of reinforcing polyethylene terephthalate, we found that there was a marked difference, as compared with the other thermoplastic resins, in the changes which take place in the properties of polyethylene terephthalate with the combination of glass fibers. The present invention was thus achieved.

Namely, we found that, in contradistinction to what would be expected by the aforesaid technical common sense, the incorporation of glass fibers in polyethylene terephthalate resin not only effects a pronounced improvement of shock and heat resistance, the defects of said resin, modulus of elasticity and resistance to creep, but also effects improvements at the same time of other properties such as, for example, tensile strength, flexural strength and hardness.

It was also found that the foregoing improvement was greatly affected by the average fiber length and content of the glass fibers, pronounced improvement effects being had when those of fiber length averaging at least 0.4 mm. to normally of the order of 8 mm., and preferably of the order of 1–6 mm., were incorporated in the molded article in an amount of 10–50% by weight, based on the molded article. As will be fully described hereinafter, there is a lower limit to the average fiber length, below which the improvement effects fall and serviceable improvement effects cannot be obtained.

This is a very distinctive feature when compared, for example, with nylon which is improved of its deficiencies of dimensional stability, moisture absorption and heat resistance by the incorporation of glass fibers, wherein the effects are observed even though the length of the incorporated fibers are very short, and again when compared with polystyrene which is improved of its strength, one of its deficiencies, by the incorporation of glass fibers but whose shock resistance, its other deficiency, shows slight improvement, even though the length of incorporated fibers is changed.

It is therefore an object of the present invention to provide molded articles of polyethylene terephthalate having superior properties which were heretofore unobtainable, and particularly molded articles of polyethylene terephthalate whose shock and heat resistances, modulus of elasticity and resistance to creep have not only been improved greatly but whose many other properties have also been improved at the same time.

Another object of this invention is to provide a molding composition for use in producing such molded articles and also a method of producing the same.

Other objects and advantages will become apparent from the following description.

In accordance with the present invention, a reinforced polyethylene terephthalate composition for molding use is provided which is characterized in that the composition contains polyethylene terephthalate resin and 10–50% by weight, based on the composition, of glass fibers having an average length of at least 0.4 mm.

The term "average length," as here used, refers to those glass fibers which consist predominantly of those which are in the vicinity of the average length of the fibers and does not include those glass fibers which consist predominantly of extremely short and extremely long fibers.

Further, the terms "molding" or "molded articles" refer to compression, transfer or injection molding and the articles so molded and extrusion molding and articles so molded of thickness normally above about 0.5 mm., such as pipes, rods and boards, but does not include textile fibers and films.

Again, it goes without saying, that such additives as pigments, lubricants, ultraviolet absorption agents, etc., which are usually incorporated in the aforesaid composition, as required, can be added.

In addition, by incorporating as a nucleating agent at least one member selected from the group consisting of carbon powders; oxides, sulfates, phosphates, silicates, oxalates, stearates, benzoates and tartarates of a metal selected from Group II of the Periodic Table; and neutral clay in an amount of 0.1–3% by weight, based on the resin portion, in the aforesaid molding composition and carrying out the molding at a minimum mold temperature, the surface characteristics of the molded articles can be improved.

On the other hand, the glass fibers to be used are the glass strands, rovings and milled fibers, which are generally used in reinforced thermoplastic resins, and it is preferred that they are those which have been given the customary treatments, for example, the silane or Volan treatment.

The method of producing the molding material of the present invention, i.e., the mixing of the polyethylene terephthalate with the glass fibers can be carried out by any method. For example, there is a method of coating the strands or rovings with molten polyethylene terephthalate by means of the wire coating technique (using a crosshead extruder) and then cutting the strands or rovings into suitable lengths, or a method of mixing with the polyethylene terephthalate the glass fibers cut into suitable lengths or ground milled fibers, then melting and extruding the mixture, followed by cutting the extruded product into chips (or pellets). In the case of the method wherein milled fibers are used, it is hard to use those which are longer than 1 mm. because they tend to separate during mixing and become aggregated. They also have the defect that they are apt to break during the melting and extrusion operation. Hence, the method in which rovings are used is to be preferred.

The term "polyethylene terephthalate," as used herein, is either a polymer obtained from terephthalic acid and ethylene glycol, or a copolymer predominantly of the foregoing polymer, or a mixture consisting of polyethylene terephthalate, a copolymer predominantly thereof and not more than 10 mol percent of other resins. Accordingly, what is referred to as polyethylene terephthalate in the present invention comprehends all the foregoing substances. To be sure, as already indicated, those resins which hinder the improvement in the properties or additions of resins in amounts which likewise hinder these improvements are naturally excluded.

When the melt viscosity curves of the molding material of the invention are measured by means of "Koka-flow-tester," we find that the curves stand up abruptly, i.e. the melt viscosity becomes suddenly low, and are very similar to that of polyethylene terephthalate alone, and with no manifestation of hindrance phenomenon owing to the glass fibers, the invention molding material can be molded very easily by means of injection or extrusion molding techniques. For instance, in the case of injection molding, temperatures of the middle part and extremity of the cylinder of the order of 245° C. and 240° C. will be sufficient, as in the case with polyethylene terephthalate alone.

In accordance with the present invention, molded articles of reinforced polyethylene terephthalate are provided, which are characterized by containing at random and uniformly glass fibers of an average length of at least 0.4 mm., in an amount of 10–50% by weight, based on said article.

Although the molding operations are carried out so as not to make the length of the glass fibers excessively short, there are cases where, depending upon the molding conditions, the length of the glass fibers contained in the composition become somewhat shorter due to breakage. In consequence, what is referred to above as an average length of at least 0.4 mm. denotes a length of the order of practically 0.4 mm., and the fibers should be molded in such a manner that they are not broken into an average length of, say, less than 0.3 mm.

Next, for illustrating the relationship between the properties of the reinforced polyethylene terephthalate molded articles and the length of the glass fibers incorporated, the values obtained for the properties when glass fibers of varying lengths were used are shown in Table I and FIGURE 1 of the accompanying drawings. FIGURE 1 is a graphic representation of the impact strength given in Table I. The relationship between the impact strength of test specimens ⅛ inch thick containing 30% by weight of glass fibers and the average length of the incorporated glass fibers is shown. The impact strength was determined by the notched Izod method. The values along the vertical axis represent the impact strength (kg.-cm./cm.), while the values along the horizontal axis represent the glass fiber length in the molding material.

TABLE I.—RELATIONSHIP BETWEEN THE LENGTH OF THE GLASS FIBERS IN THE MOLDING MATERIAL AND THE PROPERTIES OF THE MOLDED ARTICLE

| Experiment No. | Average Length of Glass Fiber in Chips, mm. | Glass Fiber Content, Percent | Tensile Strength at Break, kg./cm.$^2$ | Elongation at Break, Percent | Flexural Strength, kg./cm.$^2$ | Flexural Modulus, kg./cm.$^2$ | Impact Strength (⅛"), kg.-cm./cm. | Hardness (Rockwell M) | Glass Fiber Lengths Predominating in Molded Specimen, mm. |
|---|---|---|---|---|---|---|---|---|---|
| 1 | 0.4 | 30 | 925 | 4.3 | 1,357 | 72,800 | 6.20 | 93.2 | 0.3–0.4 |
| 2 | 1.0 | 30 | 1,140 | 4.3 | 1,600 | 77,000 | 9.10 | 92.0 | 0.8–1.0 |
| 3 | 6 | 30 | 1,380 | 4.4 | 1,950 | 79,000 | 11.1 | 92.0 | 3–5 |
| Control | | | 450 | 370 | 820 | 19,500 | 4.30 | 56.3 | |
| Comparison | Powder | 30 | 587 | 2.6 | 885 | 40,100 | 2.27 | 86.9 | 0.01–0.03 |
| Do | 0.1 | 30 | 673 | 2.5 | 1,087 | 44,300 | 2.70 | 87.0 | 0.05–0.1 |

The polyethylene terephthalate used had an intrinsic viscosity of $[\eta]=0.68$ as measured in an o-chlorophenol solution thereof at 35° C. In the case of the chips in which the length of the glass fibers incorporated were 1.0 mm. or less, milled fibers $7\mu$ in diameter were mixed in the polyethylene terephthalate, after which the mixture was melted and extruded, followed by cutting into chips. Those 6-mm. long were prepared using rovings whose diameter was $9\mu$ which was coated with the wire-coating technique, followed by cutting into 6-mm. lengths. The test specimens were prepared by injection molding.

The tests for the properties in this invention were all carried out in accordance with the following methods:

Tensile strength and elongation (yield)(break) and tensile modulus in accordance with ASTM D638, the flexural strength and flexural modulus in accordance with ASTM D790, the impact strength in accordance with ASTM D256, and the hardness (Rockwell) in accordance with ASTM D785.

As is apparent from Table I and the FIGURE 1, when the average length of the glass fibers in the molded article is 0.1 mm. or less, the strength improves slightly, but the impact strength declines. On the other hand, when the average fiber length is at least 0.4 mm., not only does the impact strength show a marked improvement but an abrupt improvement takes place in the other properties as well. That having the greatest influence on improving the properties is the length of the glass fibers. The influence of the diameter is relatively slight. The diameter of the glass fibers used is the same as that used heretofore for the other reinforced thermoplastic resins, that of the order of 5–13μ being usually used. The use of fine glass fibers is desirable since further improvements in the strength and other properties are achieved.

Figure 2:
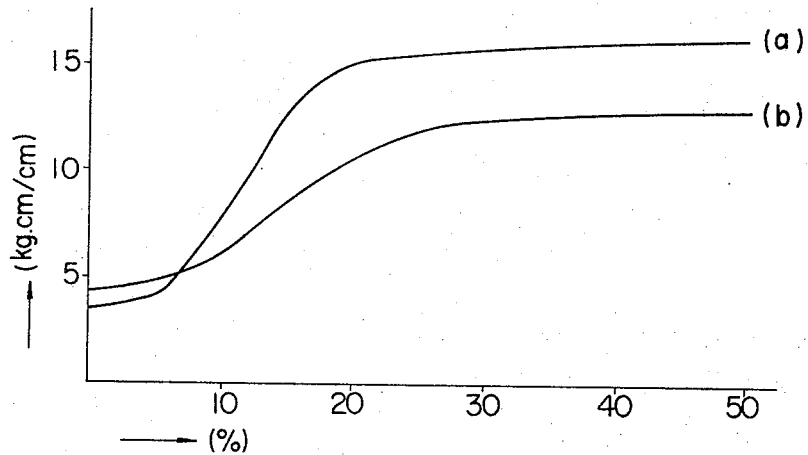

On the other hand, the content of the glass fibers in the polyethylene terephthalate composition influences the mechanical properties and heat resistance of the molded article. The content of the glass fibers according to the present invention is an amount ranging between 10% and 50% by weight. For showing the relationship between the glass fiber content and the properties of the molded article, the property values in accordance with the varying contents of the glass fibers are shown in Table II. FIGURE 2, on the other hand, is a graph showing the relationship between the glass fiber content and the impact strength of the test specimen with a thickness of ⅛" (curve b) and ¼" (curve a) respectively, the value of the impact strength (kg.-cm./cm.) being shown on the vertical axis and the glass fiber content (by weight percent) on the horizontal axis.

er), followed by cutting into chips 8 mm. in length, and thereafter injection molding the same.

As is apparent from Table II, when the glass fiber content of the molded article is 5% by weight, based on the article, only a slight improvement is observed in the impact strength. In addition, the improvement in the other properties is also meagre. But when the content is 10% or more, not only is a marked improvement observed in the impact strength, one of greatest defects of the moulded articles composed of polyethylene terephthalate alone, but the improvement of the other properties is also noted. On the other hand, when the amount of the glass fibers increases such that the content approaches 50%, the flow of the melting mass becomes unsatisfactory and at a content in excess of 50% the moulding is rendered difficult. Thus, it is necessary to hold the glass fiber content within the range of 10 to 50% by weight.

For comparing the properties of the molded articles formed from the molding materials of the present invention with the properties of the molded articles of reinforced polyamide or polycarbonate, a typical reinforced TABLE II.—RELATIONSHIP BETWEEN THE GLASS FIBER CONTENT AND THE PROPERTIES OF THE MOLDED ARTICLE

| Experiment No. | Glass Fiber Content, percent | Tensile Strength (yield), kg./cm.$^2$ | Tensile Strength (break), kg./cm.$^2$ | Elongation (yield), percent | Elongation (break), percent | Tensile Modulus, kg./cm.$^2$ |
|---|---|---|---|---|---|---|
| 1 | 10 | No yield point | 940 | No yield point | 5.1 | 32,100 |
| 2 | 20 | ___do___ | 1,150 | ___do___ | 5.2 | 55,100 |
| 3 | 30 | ___do___ | 1,350 | ___do___ | 5.2 | 78,500 |
| 4 | 40 | ___do___ | 1,500 | ___do___ | 4.8 | 97,500 |
| 5 | 50 | ___do___ | 1,690 | ___do___ | 4.7 | 119,500 |
| Control | 0 | 590 | 450 | 7.4 | 370 | 19,500 |
| Example for comparison | 5 | No yield point | 670 | No yield point | 6.3 | 26,500 |

| Experiment No. | Flexural Strength, kg./cm.$^2$ | Flexural Modulus, kg./cm.$^2$ | Impact Strength (⅛"), kg.-cm./cm. | Impact Strength (¼"), kg.-cm./cm. | Hardness (Rockwell M) | Glass Fiber Lengths Predominating in Molded Specimen, mm. |
|---|---|---|---|---|---|---|
| 1 | 1,200 | 34,500 | 6.3 | 7.7 | 91.5 | 3–5 |
| 2 | 1,740 | 57,300 | 10.5 | 15.2 | 91.3 | 3–5 |
| 3 | 1,920 | 80,500 | 12.5 | 15.8 | 94.0 | 3–5 |
| 4 | 2,050 | 99,000 | 12.7 | 16.0 | 94.0 | 3–5 |
| 5 | 2,100 | 121,000 | 12.9 | 16.3 | 93.5 | 3–5 |
| Control | 820 | 21,500 | 4.3 | 3.6 | 56.3 | |
| Example for comparison | 930 | 29,000 | 4.6 | 4.0 | 85.6 | 3–5 |

The polyethylene terephthalate used had an inherent viscosity of $[\eta]=0.65$ in an o-chlorophenol solution thereof at 35° C. The test specimens were those obtained by coating a roving consisting of 9μ filaments by means of the wire coating technique (using a cross-head extruder), thermoplastic resin that is being presently used, the property values of the respective resins are shown in Table III and the modulus of elasticity thereof after boiling water treatments for varying periods of time are shown in Table IV.

TABLE III.—PROPERTIES OF MOLDED ARTICLES OF DIFFERENT REINFORCED THERMOPLASTIC RESINS

| | Polyethylene Terephthalate | | Polyethylene Terephthalate/10 mol Percent Isophthalic Acid Copolymer | | Reinforced Polycarbonate | Reinforced Polyamide |
|---|---|---|---|---|---|---|
| | Alone | Glass Fiber Incorporated | Alone | Glass Fiber Incorporated | | |
| Glass fiber content, percent | 0 | 30 | 0 | 30 | 30 | 30 |
| Length of Predominant G.F., mm | | 3–5 | | 3–5 | 3–5 | 3–5 |
| Density | 1,346 | 1,545 | 1,323 | 1,525 | 1,450 | |
| Mold shrinkage, percent | | 0.7–0.8 | | 0.7–0.8 | 0.3–0.4 | 0.9 |
| Tensile strength (break), kg./cm.$^2$ | 450 | 1,350 | 450 | 1,450 | 1,320 | 1,320 |
| Elongation (break), percent | 370 | 5.2 | 340 | 7.8 | 4.8 | 4.5 |
| Tensile modulus, kg./cm.$^2$ | 19,500 | 78,500 | 21,600 | 89,800 | 70,000 | 61,500 |
| Flexural strength, kg./cm.$^2$ | 820 | 1,920 | 910 | 2,150 | 1,690 | 2,200 |
| Flexural modulus, kg./cm.$^2$ | 21,500 | 80,500 | 23,500 | 91,500 | 72,500 | 70,500 |
| Impact strength (¼"), kg.-cm./cm. | 3.6 | 15.8 | 2.8 | 19.1 | 15.0 | 8.7 |
| Hardness (Rockwell M) | 56.3 | 94.0 | 62.4 | 93.5 | 93.0 | 85.0 |

TABLE IV.—MODULUS OF ELASTICITY OF THE MOLDED ARTICLES OF DIFFERENT REINFORCED THERMOPLASTIC RESINS AFTER BOILING WATER TREATMENT

| Period of Boiling Water Treatment, hr. | Modulus of Elasticity After Boiling Water Treatment | | | |
|---|---|---|---|---|
| | Polyethylene terephthalate alone | 30% Glass Fiber Incorporated Polyethylene Terephthalate | 30% Glass Fiber Incorporated Polyamide | 30% Glass Fiber Incorporated Polycarbonate |
| 0 | 19,500 | 78,500 | 61,500 | 70,000 |
| 5 | 28,000 | 91,000 | 52,000 | 68,000 |
| 24 | 29,000 | 88,000 | 46,000 | 66,000 |
| 48 | 28,000 | 86,000 | 44,000 | 65,000 |
| 120 | 27,000 | 80,000 | 42,000 | 60,000 |

The average length of the glass fibers used was 6 mm.

Further, whereas the water absorption of the invention molding material was ca. 0.1% under an atmosphere of 20° C. and 60% RH for 200 hours, that of the reinforced polyamide and reinforced polycarbonate was 0.7% and 0.3%, respectively.

In addition, the results of a test on heat deflection temperature under load conducted in accordance with ASTM–D648 using the same polyethylene terephthalate resin showed, for instance, an increase of about 50% in the heat deflection temperature when a composition containing 30% by weight of glass fibers of average length 6 mm. was molded at a mold temperature of 70° C. and of the order of about 100% at 110° C.

As is apparent from what has been described hereinabove, in the invention molding material both its impact strength and heat resistance are greatly improved, and hence possessing properties which are not only excellent, it exhibits properties which are distinctive when compared with the other reinforced thermoplastic resins.

Further, by adopting a specific temperature condition during and/or after the molding operation in producing the molded articles of the present invention, it was found that the crystallinity of the polyethylene terephthalate resin at the interior and superficial portions of the article could be uniformalized to improve the surface hardness of the article and, in turn, improve conspicuously on the surface deformation which occurs at that part where a load is imposed during application of heat (hereinafter to be referred to as surface heat deformation).

Thus, much better results are attained in producing the molded articles of the present invention by employment of a method as described hereinafter.

The surface hardness, surface heat deformation, surface smoothness and surface appearance are conspicuously improved by molding at a mold temperature of 120–200° C., and preferably 125–170° C., a reinforced polyethylene terephthalate composition for molding use which comprises polyethylene terephthalate resin and 10–50% by weight, based on the composition, of glass fibers of average length of at least 0.4 mm.

Again, by molding a reinforced polyethylene terephthalate composition for molding use comprising polyethylene terephthalate resin and 10–50% by weight, based on the composition, of glass fibers of average length of at least 0.4 mm., then heating the resulting molded articles at a temperature of 120–200° C., and preferably 140–170° C., for a period of normally about 10–40 minutes, the surface hardness, surface heat deformation and surface appearance are enhanced greatly.

The surface heat deformation will be described more fully. The method of showing the surface heat deformation follows "the Standard Method of Test for Deflection Temperature of Plastics Under Load" as stipulated by ASTM D–648. This method consists in holding the specimen at two support points separated by 4 inches. The temperature is then raised at the rate of 2° C. per minute while application of a load of 264 lb./in.$^2$ at the intervenient load point. The temperature $t_1$ when the deformation of the specimen has reached $\frac{1}{100}$ inch is adopted as the heat deflection temperature.

Figure 3:
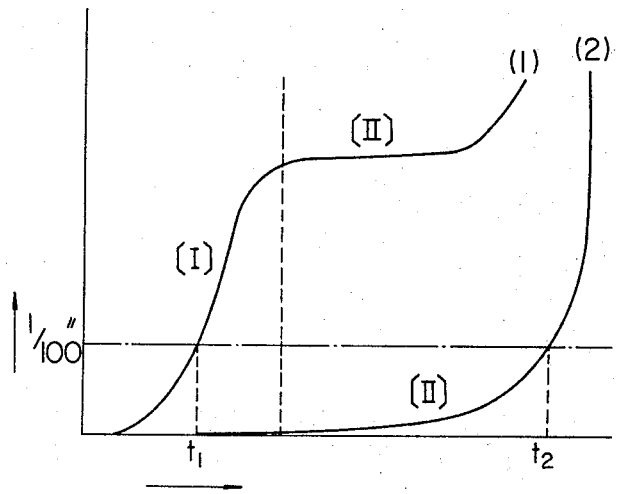
Figure 4:
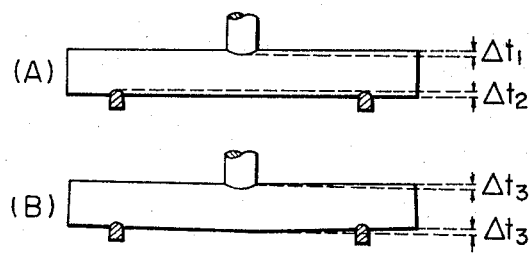

The surface heat deformation in the present invention is shown by means of a model in FIGURE 3, the amount of deformation being indicated along the vertical axis and the temperature along the horizontal axis. FIGURE 4 is for explaining this heat deformation. As is clear from FIGURE 3, the heat deformation curve exhibits different behaviors of I and II. The deformation of I is a concave surface heat deformation of the early stage at the point of load and supporting points as shown in FIGURE 4(A), i.e., a synthesis of $\Delta t_1$ and $\Delta t_2$. On the other hand, the deformation of II is a deformation occurring over the whole of the molded article as shown by $\Delta t_3$ in FIGURE 4(B). Thus, the deformations of I and II are of different nature. That is to say, the deformation of I is an apparent deformation, while that of II is the true deformation. In those in which this surface heat deformation is great, the surface and inside are nonuniform, but this is believed to be due to difference in the inside structures. This is believed to be due to the following reason. Namely, since the crystallinity of polyethylene terephthalate is great, its crystallization temperature is high and its heat conductivity is low, when a melt thereof is injected and formed in a mold, the outer part of the molded article is quickly cooled by the mold and with the formation of crystals being hindered become an amorphous structure, whereas the inner part is gradually cooled and crystals are formed. Hence, the outer part of this molded article becomes either transparent or semitransparent while the inner part becomes white and opaque. Furthermore, the hardness of the surface becomes lower than the inner part, and the surface deformation I of FIGURE 3 as shown in FIGURE 4(A) occurs in the early stage. This deformation I, i.e., apparent deformation, is referred to as the surface heat deformation in the present invention.

The reinforced polyethylene terephthalate molded article of the present invention, as hereinbefore described, can be molded using a mold temperature of at least 120° C. and various combinations of conditions covering a broad range such as, for example, a cylinder temperature of 250–270° C., a nozzle temperature of 240–260° C., an injection pressure of 600–1300 kg./cm.$^2$, a holding pressure of 550–1250 kg./cm.$^2$, an injection and holding pressure time of 5–16 seconds and a screw back pressure of 80–300 kg./cm.$^2$. Thus, the surface condition of the molded article can be improved greatly, and the molded article can be made to have a smooth, lustrous and uniform surface, and in addition be made a uniform white opaqueness so that the glass fibers dispersed in the molded article are not discernible to the naked eye. Further, the surface properties and the moldability of the article are also enhanced greatly.

Next, in Table V are shown the heat deflection temperature, surface hardness and surface smoothness of molded articles obtained using the invention molding composition but varying the mold temperature. The reinforced molding material used was in all cases those containing 30% of glass fibers of an average length of 6 mm., and the molding conditions employed were those which were the best for the several mold temperatures.

TABLE V

| Mold Temperature, °C. | Heat Deflection Temperature, °C. | Hardness (Rockwell M) | Smoothness* (Bekk Testing Method), sec. |
| --- | --- | --- | --- |
| 70 | 96 | 93.2 | 5 |
| 90 | 190 | 94.5 | 8 |
| 110 | 215 | 97.6 | 85 |
| 120 | 238 | 102.5 | 204 |
| 130 | 242 | 104.1 | 237 |
| 150 | 240 | 104.0 | 240 |
| 170 | 242 | 104.0 | 240 |

* The Testing Method of Smoothness of Paper and Paperboard by Bekk Tester as stipulated in JIS P8119–1963 is employed. In accordance with this method, on a plate glass whose surface has been given an optically flat finish and having a small hole provided in the middle thereof the surface of the specimen to be measured is placed and by applying a load (1 kg./cm.²) from the top, the setting is accomplished. Then when suction is applied from one end of a tube directly connecting with the small hole and the suction is stopped when a mercury column provided at the other end reaches a given height, air flows in from between the optically flat surface and the surface of the specimen to be measured and the height of the mercury column falls. The amount of air flowing in varies with the state of unevenness of the surface of the specimen to be measured, and in correspondence therewith the extent to which the mercury column falls also varies. Hence, it is possible to indicate the smoothness by means of the time (seconds) required for the mercury column to fall from a specified height to a given height. Thus, as this time becomes longer, the indication is that the specimen is smoother.

When the mold temperature is 70–120° C. the heat deformation curve of the molded articles exhibits two different behaviors as illustrated by means of FIGURES 3 and 4, and hence the inner and outer parts of the molded articles are heterogeneous. However, when the mold temperature is at least 120° C., the early stage surface heat deformation disappears from the heat deformation curve and a simple behavior is manifested, thus showing that both the inner and outer parts of the molded article is homogeneous. This is indicated in Table V, above, by means of the heat deformation temperature. Further, the surface hardness is also influenced greatly by the mold temperature that is used during the molding operation. When the mold temperature becomes at least 120° C., a marked enhancement is shown, and when it becomes at least 125° C., an excellent value, which is nearly fixed, is exhibited. Further, this value (104.0) is a high value not seen in the case of the usual reinforced thermoplastic resins but is a value which corresponds to that of the reinforced thermosetting resins.

The surface smoothness is also seen to be improved markedly at a temperature at least about 120 C. The resistance to creep is also improved.

By way of comparison, the surface hardness of the molded articles of various resins is shown in Table VI.

TABLE VI.—RESIN

| | Hardness (Rockwell M) |
| --- | --- |
| Molded articles according to present invention | 104 |
| Reinforced polyamide | 85 |
| Reinforced polycarbonate | 88 |
| Reinforced epoxy resin | 100–108 |
| Reinforced phenol resin | 95–100 |
| Reinforced phenol resin containing pwd. wood and cotton | 100–120 |

Hence, it is of great advantage in producing molded articles in the present invention from the invention composition to employ a mold temperature of at least 120° C. Although molding becomes impossible starting from the neighborhood of 200° C., at 180°–190° C. the molding is still possible. The intrinsic viscosity [η] of polyethylene terephthalate tends to decrease at these temperatures, however. Hence, according to the present invention, the molding is best carried out at a mold temperature of 120°–200° C., and preferably 125°–170° C.

Again, as previously noted, the surface hardness, surface heat deformation and surface appearance can be improved greatly by first forming the invention molded article and then heating it at a temperature of 120–200° C., and preferably 140–170° C. for a period usually of the order of 10–40 minutes.

For instance, in Table VII, below, are given the minimum treatment times that a test specimen formed at a mold temperature of 70° C. require to become homogeneously crystallized by the foregoing treatment to exhibit a heat deformation temperature of at least 210° C.

TABLE VII.—MINIMUM TREATMENT TIME REQUIRED AT THE VARIOUS TREATMENT TEMPERATURES

| Treatment Temperature, °C. | Treatment Time, min. | |
| --- | --- | --- |
| | Molded Article Containing 10% Glass Fibers* | Molded Article Containing 30% Glass Fibers* |
| 100–110 | 220 | 180 |
| 120 | 40 | 30 |
| 140 | 15 | 12 |
| 150 | 10 | 10 |
| 170 | 8 | 7 |
| 190 | 8 | 7 |

*Average length of glass fibers in both cases was 6 mm.

As is apparent for Table VII, in the case of a molded article which has been formed in a mold of relatively low temperature, a very long period of heat treatment is required when the treatment temperature is 110° C. At below 110° C., its crystallization is hard to attain and thus it is difficult to obtain any results from the heat treatment at such a temperature. On the other hand, when the treatment temperature exceeds 120° C., the treatment time is abruptly shortened, but when 200° C. is exceeded, there is the danger of a decline taking place in the molecular weight as a result of over-heating. The treatment time varies greatly in accordance with the treatment temperature and also varies somewhat depending upon the fiber content. Thus, although the treatment temperature of at least 120° C., and preferably 140–170° C., and a treatment time of usually about 10–40 minutes are used, it is difficult to lay down a hard and fast rule. Further, since a deterioration in the properties of the molded article is apt to occur when this heat treatment is carried out with superheated steam, a dry heat treatment is to be preferred. When the treatment temperature is high in carrying out this heat treatment, it is preferred that care be exercised to ensure that the heat is uniformly applied to the whole of the molded article. Further, there is no harm at all even though the treatment time becomes excessive. No special care need be exercised in cooling the molded article. It may be cooled gradually or suddenly. This heat treatment can be carried out using the generally practiced heat treatment methods and using the apparatus used therein. As such methods, included are, for example, the methods employing circulating hot air, radiant electric heat and infrared heaters.

Figure 5:
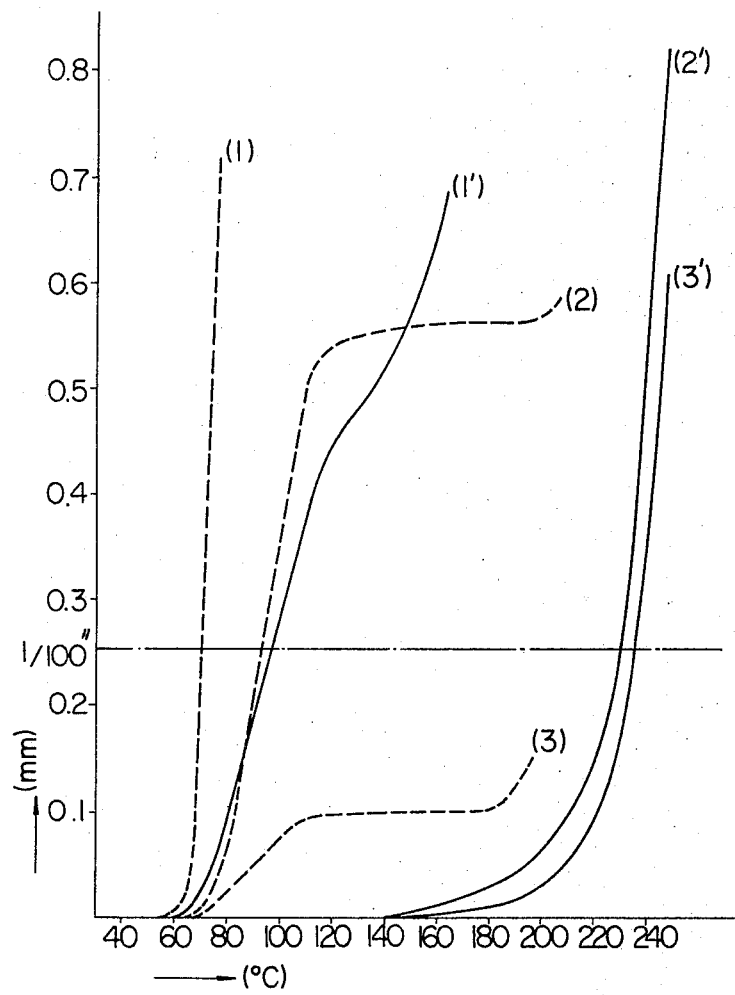

The relationship between the temperature and the amount of deformation of the invention molded article as a result of heat treatment after molding is shown in FIGURE 5. The dotted line 1 in the figure is the heat deformation curve of a molded article formed at a mold temperature of 70° C. using polyethylene terephthalate not containing any glass fibers and not given a heat treatment. The dotted lines 2 and 3 are the heat deformation curves of molded articles of polyethylene terephthalate containing 30% of glass fibers (average length 6 mm.) which were formed at mold temperatures of 70° and 110° C., respectively, and likewise untreated. The curves 1', 2' and 3' are the heat deformation curves of the molded products of the dotted lines 1, 2 and 3, which were heat treated for 30 minutes at 140° C. with hot air. In the figure, the amount of heat deformation (mm.) are indicated on the vertical axis while the temperatures (° C.) are indicated on the horizontal axis. As is apparent from this figure, the heat deflection temperatures of the molded articles not containing any glass fibers are exceedingly low and are such that there is hardly any improvement in their heat deflection temperatures even though they are given a heat treatment, and hence they are unserviceable. On the other hand, the untreated molded articles containing glass fibers vary exceedingly in their heat deflection temperature depending upon the mold temperature during their molding, but in both cases the early stage surface heat deformation during heating disappears as a result of the heat treatment and only the deformation over the whole of the molded article remain, the heat deflection temperature becoming a high value of at least about 230° C. Further, the heat deformation curve also becomes practically the same, for example, as with the case of the previously noted curve 2 shown in FIGURE 3. Namely, the early stage surface heat deformation during heating disappears as a result of the heat treatment according to the present invention, with the consequence that the inner and outer parts of the molded article become homogeneous, the heat deflection temperatures rises, and the molded articles having different mold temperatures also become to exhibit the same heat deformation behaviors (see curve 2 of FIGURE 3).

The surface hardness of the molded article obtained in accordance with the present invention by heat treatment after molding is improved remarkably, the results being the same as that hereinbefore noted in connection with the mold temperature during molding. When the content in the molded article of the glass fibers of an average length of at least 0.4 mm. becomes at least of the order of 10% by weight, a nearly constant value of 105 is attained, a value comparable to that of the thermosetting resins.

Figure 6:
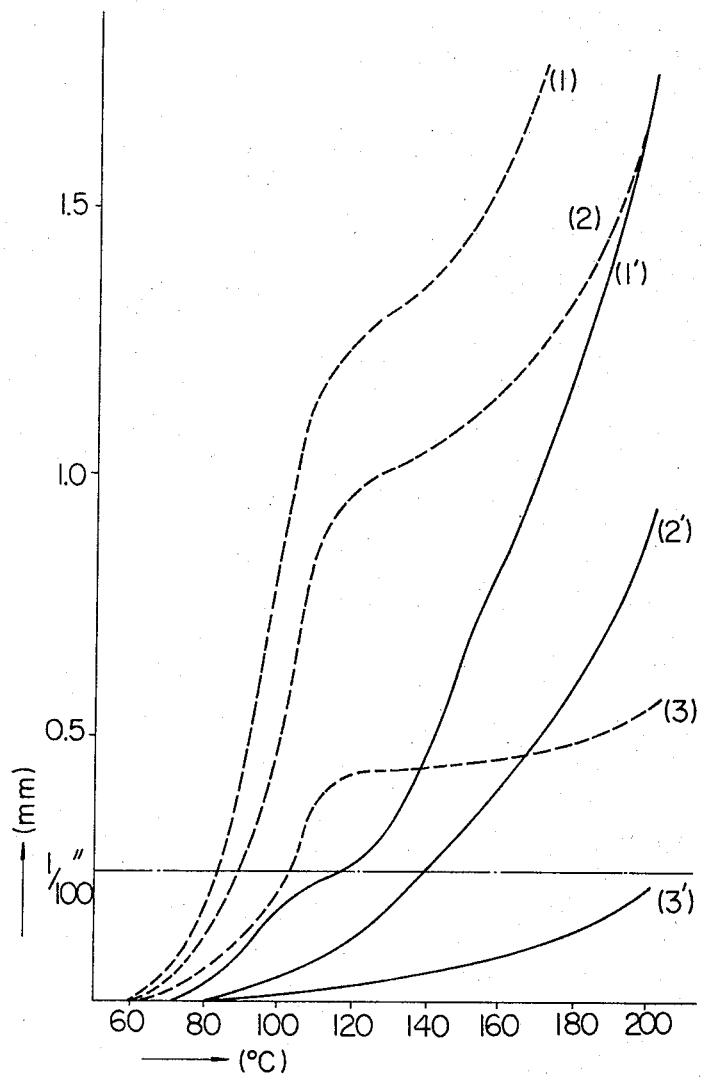

In FIGURE 6 are shown the relationship between the temperature and the amount of deformation of molded articles containing glass fibers of varying average length in the heat treatment after molding of these articles. The dotted lines 1, 2 and 3 are the heat deformation curves of untreated molded articles containing 30% of glass fibers of average lengths of respectively 0.05 mm., 0.1 mm. and 0.4 mm.; the dotted lines 1', 2' and 3' being the heat deformation curves of the molded articles having the curves of dotted lines 1, 2 and 3, after having been heat treated by means of hot air for 20 minutes at 140° C. In the figure, along the vertical axis are shown the amount of heat deformations while along the horizontal axis are shown the temperatures. As is apparent from this figure, the heat deformation temperature of the molded articles containing the powdered glass and the glass fibers of an average length of 0.1 mm. was low even though they were given a heat treatment, and an excessive true deformation takes place in these molded articles at relatively low temperatures. Again, when the glass fiber content was less than 10%, the properties, and particularly the impact strength and heat resistance, were inferior such that the articles were unserviceable. And even though a heat treatment was given, there was hardly any improvements in these properties. When a heat treatment was given to a molded article of polyethylene terephthalate alone which contained no glass fibers at all, deformation took place in the early stage of the heating, along with partial shrinkage. Thus, it could not stand the heat treatment, and even though a heat treatment was given, there was hardly any improvement in the properties.

Figure 7:
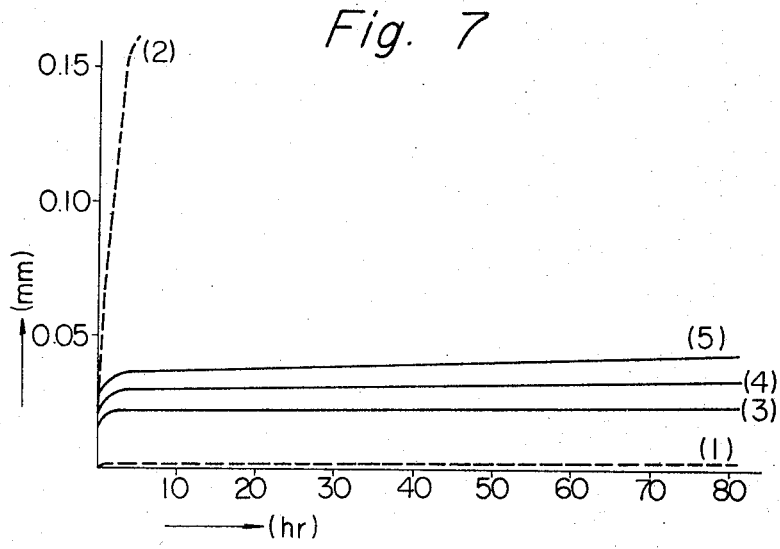

As to the changes in the creep property of the molded articles of the invention obtained by heat treatment, these are shown in FIGURE 7. The time is shown along the horizontal axis while along the vertical axis is shown the amount of deformation corresponding to this time. The dotted lines 1 and 2 are the creep property curves under a load of 250 kg./cm.$^2$ of the untreated molded test specimens formed at a mold temperature of 70° C. and containing 30% of glass fibers of an average length of 6 mm., the curves being that measured at 30° and 80 C., respectively. On the other hand, the curves 3, 4 and 5 are the creep property curves of the molded specimens after having been heat treated for 30 minutes at 150° C. with hot air, the specimens having been measured at 80°, 140° and 180° C., respectively. The measurements were carried out in accordance with ASTM D-674-56. As is apparent from this figure, the untreated specimen exhibited practically no deformation at a low temperature, but at 80° C., it was deformed greatly in a short period of time. However, when it was heat treated, only a very slight deformation occurred in the early stage but thereafter this slight deformation was maintained with hardly any regard to time, a similar behavior being also manifested at elevated temperatures. That is to say, the creep property of a molded article is greatly improved by the heat treatment according to this invention.

We have described hereinbefore with regard to the molded article of reinforced polyethylene terephthalate, the molding composition and the method of production thereof of the present invention. However, according to the invention, by using a composition in which has been incorporated the previously noted nucleating agent, it becomes possible to carry out the molding operation at the usual mold temperature of 70°–110° C. and to obtain results with respect to the improvement of the surface hardness, disappearance of surface deformation during heating and improvement of surface appearance, which are comparable to those obtained by the hereinbefore described two methods, i.e., the method of a relatively high mold temperature and the method of carrying out a heat treatment of the molded article after its formation. Hence, since excellent results are obtained with a minimum mold temperature, it is to be preferred also from the standpoint of moldability. The foregoing production methods can be employed suitably combined, if desired.

Next, a description will be made with respect to the choice of the nucleating agent when use is to be made of the nucleating agent-containing molding composition according to the present invention. The nucleating agent to be used in the invention include the carbon powders such as graphite and carbon black, the oxides of the metals of Group II of the Periodic Table, such as ZnO and MgO, the sulfates such as $CaSO_4$ and $BaSO_4$, the phosphates such as $Ca_3(PO_4)_2$, the silicates such as $CaSiO_3$ and $MgSiO_3$, the oxalates such as calcium oxalate, the stearates such as magnesium stearate, the benzoates such as calcium benzoate, the salicylates such as zinc salicylate, tartrates such as calcium tartrate, talc and the neutral clays such "Hitoron" (a product of Shiraishi Calcium Company, Japan), which are all desirable. A choice is made particularly from those whose induction time (hereinafter indicated as $Ts$), as described in J. H. Magill, Polymer, 1961, 2, 221–223, is 10 seconds or less and half-time (hereinafter indicated as $T_{1/2}$) is 15 seconds or less, and moreover whose extent of decline in $[\eta]$ in an o-chlorophenol solution at 35° C. is low when 1% by weight, based on the polyethylene terephthalate, of the nucleating agent is added, the choice usually being made from those which do not cause a fall in the $[\eta]$ of the order of less than about 0.50.

As to the effects of this nucleating agent on the molded article, serviceable results are not obtained in the case where polyethylene terephthalate is used alone, but it is markedly effective in the case of polyethylene terephthalate containing glass fibers of an average length of at least 0.4 mm. Although it is known that improvement effects by means of nucleating agents are had by the other crystalline high polymers, say, polyamides and polyolefins, singly, similar effects cannot be expected of the polyethylene terephthalate resin singly.

The addition of the nucleating agent which is characterized in the point that it has surface improvement effects on the molded article of polyethylene terephthalate resin containing glass fibers according to the present invention is accordingly bound by the principal conditions of the glass fiber which is basic. Namely, the necessary conditions that the glass fiber must have for manifesting good mechanical and thermal properties as a molded article are that the content thereof in the molded article is at least 10% by weight and that the fiber length of those contained average at least 0.4 mm. Thus, as the material, one meeting these conditions is serviceable.

The unique action that takes place when the nucleating agent-incorporated molded composition according to the present invention is used will be described by means of a specific example.

Figure 8:
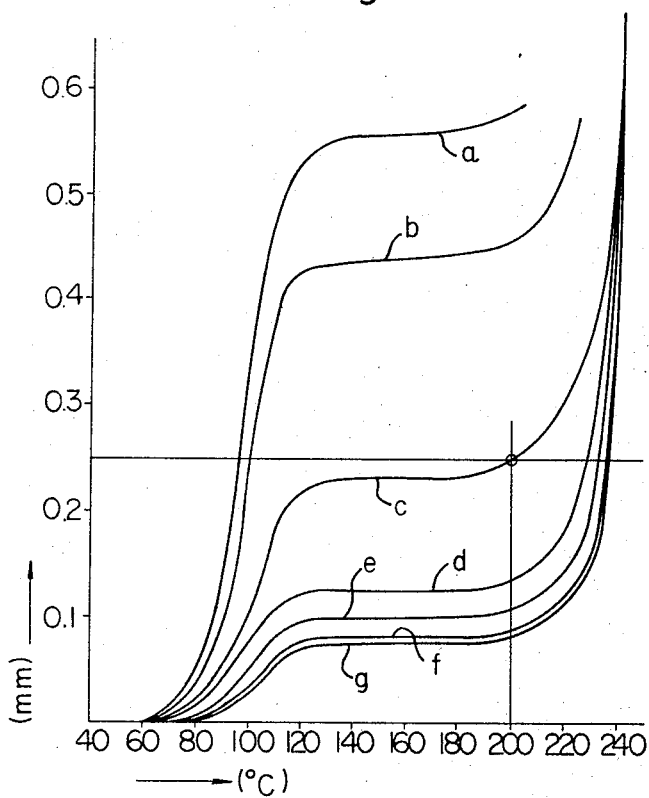

Using graphite as the nucleating agent, polyethylene terephthalate resin incorporated with 0.3% by weight of the nucleating agent, based on the resin, and those not incorporated with the nucleating agent were formed into test specimens at the same mold temperature (70° C.). The heat deflection temperature and the typical mechanical properties of these specimens are shown in Table VIII.

suitable amount will naturally be found since the size of the particles of a nucleating agent, its chemical structure and its polarity differ. These affect the function as a nucleating agent. For example, in FIGURE 8 there is shown a graph of the heat deformation behavior depending on the amount added of the nucleating agent. This graph shows the comparative values in the case where glass fibers of an average length of 6 mm. were used whose content was 30% by weight and as the nucleating agent talc was used which was added in the amounts on a weight basis, based on polyethylene terephthalate, of 0% (curve $a$), 0.05% (curve $b$), 0.1% (curve $c$), 0.3% (curve $d$), 0.5% (curve $e$), 1% (curve $f$) and 3% (curve $g$). The amount of heat deformation is shown along the vertical axis and the temperature along the horizontal axis. As is apparent from this figure, the minimum amount to be added is an amount ca. 0.1% by weight. On the other hand, it is shown that at the upper limit, although additions are made above a certain amount, results in proportion are not obtained, but the nucleating agent merely serves as a filler. Hence, an amount which acts as a nucleating agent is 3% at highest. On the other hand, the addition of it in such a great amount as more than 10% is not preferable in the light of other mechani-

TABLE VIII

| Glass Fiber Content, Percent | Nucleating Agent added or not added | Heat Deflection Temperature, ° C. | Early Stage Surface Heat Deformation | Hardness (Rockwell M) | Impact Strength (¼"), kg.-cm./cm. |
|---|---|---|---|---|---|
| 0 | Not added | 64 | Completely deformed. | 56.3 | 3.6 |
| 0 | Added | 70.5 | ----do---- | 74 | 3.2 |
| 10 | Not added | 83 | Pronounced | 91.5 | 7.7 |
| 10 | Added | 210 | Slight | 94.0 | 7.0 |
| 20 | Not added | 86 | Pronounced | 91.3 | 15.2 |
| 20 | Added | 225 | Slight | 95.8 | 14.9 |
| 30 | Not added | 96 | Pronounced | 94 | 15.8 |
| 30 | Added | 232 | Slight | 98.7 | 15.4 |

The mechanical properties which do not depend on the surface condition of the molded article, i.e., the tensile strength, flexural strength and modulus of elasticity will also depend on the glass fiber content regardless of whether or not the nucleating agent is added.

Similarly, the values obtained when 0.3% of graphite based on polyethylene terephthalate was added as nucleating agent to molding materials in which the content of glass fibers was set at 30% but the length of the glass fibers was varied are shown in Table IX.

cal properties. Of the nucleating agents used, graphite and carbon black, and especially the latter, possess covering power and also have the effect that they can also serve as a coloring black pigment. Typical of those which are white is titanium dioxide. However, as to the functions as a nucleating agent, as intended by the present invention, both the anatase and rutile types of titanium dioxide are small. Thus, in using titanium dioxide as a white pigment, one of those of the white type is chosen from the others which are effective as a nucleating agent

TABLE IX

| Length of Glass Fibers in Molding Material | Nucleating Agent Added or Not Added | Heat Deflection Temperature, ° C. | Early Stage Surface Heat Deformation | Hardness (Rockwell M) | Impact Strength (⅛"), kg.-cm./cm. | Glass Fiber Length of Molded Article, mm. |
|---|---|---|---|---|---|---|
| Glass powder (10–40μ) | Not added | 86 | Very pronounced | 86.9 | 2.27 | 0.01–0.03 |
| Do | Added | 108 | Pronounced | 91.5 | 2.15 | 0.01–0.03 |
| 0.1 mm | Not added | 88 | Very pronounced | 87 | 2.70 | 0.05–0.1 |
| 0.1 mm | Added | 127 | Pronounced | 92.2 | 2.60 | 0.05–0.1 |
| 0.4 mm | Not added | 95 | ----do---- | 93.2 | 6.20 | 0.3–0.4 |
| 0.4 mm | Added | 214 | Slight | 97.5 | 5.90 | 0.3–0.4 |
| 1 mm | Not added | 96 | Pronounced | 92.0 | 9.10 | 0.8–1.0 |
| 1 mm | Added | 218 | Slight | 98.6 | 9.00 | 0.8–1.0 |

As to the values of the other mechanical properties, those fully presented in Table I were manifested. As is apparent in a comparison with the values of Table IX also, it is required that the length of the glass fibers in the molding material used is at least 0.4 mm. to obtain results by adding the nucleating agent. It is in such a case that the effects of the addition of the nucleating agent are manifested.

It is not possible to specify by a hard and fast rule the amount in which the nucleating agent is to be added, it depending upon the particular agent used, but as an amount which is suitable for crystallization of polyethylene terephthalate as a nucleating agent, a minimum of 0.1% by weight, based on the resin, is required. This and blended with titanium dioxide. For example, if 0.3% of talc and 2% of titanium dioxide are blended and used, the effect as a white pigment and that as nucleating agent can both be utilized effectively. This also applies equally to the other colored materials and hence the range of application is wide.

For a better understanding of the invention, the following examples illustrating the mode of practicing the same are given.

*Examples 1–5 and comparison 1*

A silane treated-roving consisting of 6000 monofilaments 9μ in diameter was coated by means of the wire-coating technique with polyethylene terephthalate having an intrinsic viscosity $[\eta]=0.68$ (o-chlorophenol solution) and a softening point of 262.4° C., by extrusion at an extrusion temperature of 265° C., such that the content of the glass fibers, based on the molding material, would be on a weight basis 10% (Example 1), 20% (Example 2), 30% (Example 3), 40% (Example 4) and 50% (Example 5), following which the coated roving was cut into 6-mm. lengths and used as the molding material.

Molded pieces of 50 grams each were prepared by injection molding the foregoing material at an injection temperature of 250° C., an injection pressure of 800 kc./cm.$^2$ and a mold temperature of 70° C. The properties of the molded pieces obtained and that of a similarly obtained molded piece of the same configuration and of the same polymer not containing the glass fibers (used for comparison) and that containing 5% by weight of the glass fibers were practically the same as those of Nos. 1, 2, 3, 4, 5, the control and comparison, respectively, of the previously presented Table II.

*Examples 6–8*

The molded pieces of the foregoing Examples 1, 2 and 3 (having properties similar to those of Nos. 1, 2 and 3, respectively, of Table II) were placed in a 140° C. dryer of the hot air circulation type where they were heat treated for 15 minutes, after which they were taken out and allowed to cool at room temperature, thereby yielding uniformly white and opaque molded pieces. The properties of the molded pieces before and after the heat treatment are shown in Table X, below.

*Examples 12–14 and comparisons 3 and 4*

Except that the average length of the fiber in the molding material was changed to 0.1 mm. and powder (Comparisons 3 and 4, respectively) and 1.0 mm., 6 mm. and 8 mm. (Examples 12, 13 and 14, respectively), the experiments were otherwise carried out as in Example 3 (fiber content 30% by weight). The results obtained were practically the same as those previously presented in Table I of the description for the comparisons and experiments Nos. 2 and 3. On the other hand, the results obtained for the 8-mm. length fibers were practically the same as those of Example 13.

*Examples 15–16*

Polyethylene terephthalate identical to that used in Example 1, after being ground, was charged to a V type-blender with Volan-treated milled fibers 7μ in diameter and 0.4 mm. long so that the content of the glass fibers would become 35% by weight and mixed for 2 minutes, following which the mixture was extruded at an extrusion temperature of 265° C., followed by cutting the extruded material into pellets. Using this as the molding material, molded pieces were formed by injection molding under conditions identical to those of Example 1 except that a mold temperature of 110° C. was used (Example 15). The resulting molded pieces were then heat treated in drying over of the hot air circulation type for 7 minutes at 170°

TABLE X

| Glass Fiber Content, wt. percent | Treated or Untreated | Tensile Strength (break), kg./cm.$^2$ | Flexural Strength, kg./cm.$^2$ | Flexural Modulus, kg./cm.$^2$ | Impact Strength (¼"), kg.-cm./cm. | Hardness (Rockwell M) | Heat Deflection Temperature (264 lb./in.$^2$), ° C. | Appearance |
|---|---|---|---|---|---|---|---|---|
| 10 | Untreated (Example 1). | 930 | 1,210 | 34,500 | 7.6 | 91.0 | Had apparent deformation (83° C.). | Surface layer portion transparent. |
| 10 | Heat treated (Example 6). | 920 | 1,250 | 45,760 | 7.4 | 104.1 | 218 | Uniformly white and opaque. |
| 20 | Untreated (Example 2). | 1,130 | 1,740 | 57,000 | 15.2 | 92.0 | Had apparent deformation (86° C.). | Surface layer portion transparent. |
| 20 | Heat treated (Example 7). | 1,100 | 1,820 | 70,220 | 15.0 | 104.5 | 225 | Uniformly white and opaque. |
| 30 | Untreated (Example 3). | 1,300 | 1,900 | 80,500 | 15.8 | 93.5 | Had apparent deformation (90° C.). | Surface layer portion transparent. |
| 30 | Heat treated (Example 8). | 1,320 | 2,050 | 100,500 | 15.8 | 104.5 | 235 | Uniformly white and opaque. |

NOTE.—In all cases the predominant glass fiber length was 3–5 mm. Further, the control molded piece not containing the glass fiber deformed t such an excessive degree that its measurement was impossible.

*Examples 9–11 and comparative Example 2*

Except that the molding was carried out at a mold temperature of 130° C., the experiments were otherwise carried out as in Examples 1, 2 and 3, with the results shown in Table XI.

C. after which they were removed from the oven and were allowed to cool. Thus was obtained uniformly white and opaque molded pieces (Example 16). The properties of the molded pieces before and after the heat treatment are shown in Table XII.

TABLE XI

| Example | Glass Fiber Content, wt. percent | Mechanical Properties | | | | | Surface Properties | | |
|---|---|---|---|---|---|---|---|---|---|
| | | Tensile Strength, kg./cm.$^2$ | Flexural Strength, kg./cm.$^2$ | Flexural Modulus, kg./cm.$^2$ | Impact Strength (¼"), kg.-cm./cm. | Heat Deflection Temperature, (264 lb./in.$^2$) ° C. | Heat Deformation Behavior | Hardness (Rockwell M) | Appearance |
| Comparative Example 2. | 0 | 820 | 1,090 | 28,100 | 2.9 | 96 | Excessive true deformation. | 93.0 | Uniformly white and opaque. |
| 9 | 10 | 940 | 1,250 | 46,000 | 7.5 | 212 | No apparent deformation. | 103.5 | Do. |
| 10 | 20 | 1,120 | 1,870 | 71,200 | 15.0 | 235 | ....do.... | 104.0 | Do. |
| 11 | 30 | 1,340 | 2,020 | 99,500 | 15.8 | 242 | ....do.... | 104.5 | Do. |

TABLE XII

| Example | Surface Appearance | Tensile Strength (break), kg./cm.$^2$ | Elongation (break), kg./cm.$^2$ | Flexural Strength, kg./cm.$^2$ | Flexural Modulus, kg./cm.$^2$ | Hardness (Rockwell M) | Heat Deflection Temperature, 264 lb./in.$^2$ °C. |
|---|---|---|---|---|---|---|---|
| 15 (untreated) | Partially transparent portions scattered over surface. | 1,030 | 4.5 | 1,396 | 75,000 | 93.7 | 105 (apparent deformation). |
| 16 (heat treated) | Uniformly white and opaque. | 1,030 | 4.4 | 1,500 | 98,000 | 104.8 | 232 (no apparent deformation). |

Further, the heat deformation at 200° C. of the molded article of Example 15 was 0.55 mm., while that of Example 16 was 0.12 mm.

*Example 17*

The procedures described in Example 15 were followed except that mold temperatures of 140° and 160° C. were used. The resulting molded articles in both cases exhibited the same properties as those of Example 16 of Table XII. In these molded articles, surface smoothness was also exhibited.

molding-machine at a cylinder temperature of 230–240° C., an injection pressure of 1000 kg./cm.$^2$ and a mold temperature of 100° C. The resulting molded pieces were heat treated in a heating oven for 40 minutes at 125° C. and uniformly white and opaque molded pieces were obtained. The properties of the molded articles before and after the heat treatment are shown in Table 13. As control is presented that of material (a) in which glass fibers were not incorporated and heat treatment was not given. When this was heat treated at the same conditions as hereinabove given, it was completely deformed.

TABLE XIII

| Example | Material | Tensile Strength, kg./cm.$^1$ | Elongation, percent | Flexural Strength, kg./cm.$^2$ | Modulus of Elasticity, kg./cm.$^2$ | Impact Strength (⅛″), kg.-cm./cm. | Hardness (Rockwell M) | Appearance | Heat Deflection Temperature, °C. | Heat Deformation Behaviour |
|---|---|---|---|---|---|---|---|---|---|---|
| 18 (untreated) | (a) | 1,450 | 7.8 | 2,150 | 89,800 | 15.1 | 93.5 | Middle part opaque. | | Had apparent deformation. |
| 19 (treated) | (a) | 1,400 | 4.5 | 2,230 | 101,200 | 14.8 | 103.9 | White and opaque. | 205 | No apparent deformation. |
| 20 (untreated) | (b) | 1,250 | 5.2 | 1,850 | 80,800 | 14.1 | 92.5 | Middle part semitransparent. | | Had apparent deformation. |
| 21 (treated) | (b) | 1,220 | 4.1 | 1,980 | 90,100 | 13.7 | 99.8 | White and opaque. | 200 | No apparent deformation. |
| 22 (untreated) | (c) | 1,310 | 5.9 | 1,655 | 73,200 | 14.0 | 93.0 | Middle part opaque. | | Had apparent deformation. |
| 23 (treated) | (c) | 1,290 | 4.3 | 1,850 | 82,500 | 13.2 | 101.5 | White and opaque. | 205 | No apparent deformation. |
| 24 (untreated) | (d) | 1,195 | 5.4 | 1,630 | 75,500 | 13.6 | 90.7 | Middle part semitransparent. | | Had apparent deformation. |
| 25 (treated) | (d) | 1,150 | 4.2 | 1,890 | 86,200 | 13.5 | 98.8 | White and opaque. | 205 | No apparent deformation. |
| Control (untreated) | (a)$^1$ | 620 | 11.1 | 910 | 21,600 | 3.1 | 62.4 | Middle part opaque. | 63 | True deformation great. |

$^1$ But not containing glass fibers.

*Examples 18–25*

(a) Polyethylene terephthalate copolymer containing 10 mol percent of isophthalic acid ([$\eta$]=0.73, softening point 230.4° C., glass transition point 68.2° C.).

(b) Polyethylene terephthalate copolymer containing 10 mol percent of p-hydroxybenzoic acid ([$\eta$]=0.64, softening point 233.2° C., glass transition point 73.9° C., specific gravity 1.330).

(c) Polyethylene terephthalate copolymer containing 10 mol percent of 2,2′-4,4′-tetramethylcyclobutane diol 1:3 ([$\eta$]=0.65, softening point 231° C., glass transition point 63.6° C., specific gravity 1.313).

(d) Polyethylene terephthalate copolymer containing 10 mol percent of 1:4 cyclohexane dimethanol ([$\eta$]=0.70, softening point 225° C., glass transition point 68.7° C., specific gravity 1.306).

Four silane-treated rovings consisting of 3000 monofilaments having a diameter of 9.7$\mu$ were separately coated with each of the foregoing materials (a)–(d) by extruding and coating said materials by means of the wire-coating technique, following which they were cut into 6-mm. length. Using these as the molding materials, molded pieces were formed from each using a 4-ounce injection When the procedures described in Examples 18 and 19 were followed except that a 95:5 polymer blend of polyethylene terephthalate and polyethylene isophthalate was used, the results obtained were practically identical.

*Examples 26–29*

The resins (a), (b), (c) and (d), as used in Examples 18, 20, 22 and 24, were used for Examples 26, 27, 28 and 29, respectively, and were formed (no heat treatment being given) in the same manner except that a mold temperature of 135° C. was used. When the resulting molded pieces were tested in a similar manner, results identical to those of the corresponding Examples 19, 21, 23 and 25, respectively, were obtained. Surface smoothness property was also improved at the same time, however.

*Examples 30–35*

A silane-treated glass fiber roving comprising an association of 30 strands each of which consists of 200 monofils 9$\mu$ in diameter was coated with polyethylene terephthalate having an intrinsic viscosity [$\eta$]=0.68 (o-chlorophenol solution) and a softening point of 262.4° C., using an extruder and by means of the wire-coating technique in such a manner that the glass fiber content becomes 30% by weight, after which the coated roving was cut into 6-mm. lengths, thus obtaining a molding material consisting of chips 3 mm. in diameter and 6 mm. in length.

Next, 1.0%, based on the polyethylene terephthalate in the molding material, of graphite, talc, calcium benzoate, zinc oxide and calcium sulfate were each dry blended separately with the molding material chips in a V-type blender, followed by drying for 3 hours at 160° C. with hot air. Immediately thereafter, injection molding was carried out at an injection temperature of 260° C., a mold temperature of 70° C., injection pressure of 800 kg./cm.² and a cooling time of 35 seconds to yield 50 gram molded pieces with the complete cycle requiring 45 seconds.

The property values of the respective pieces, upon measurement, were as shown in Table XIV.

*Examples 36–39*

The same polyethylene terephthalate powder as used in Example 30, milled fibers 7μ in diameter and 0.4 mm. in length which were given a Volan treatment, and 0.3% by weight, based on the polyethylene terephthalate, of any one of powders of calcium silicate, calcium oxalate and graphite were charged to a V-type blender. After blending these mixtures for 2 minutes, they were made into molding materials by extrusion at an extrusion temperature of 265° C., followed by cutting into pellets. The glass fiber content was 30%. These molding materials were injection molded under the same conditions as in Example 30. The properties of the resulting test specimens are shown in Table XV.

*Examples 40 and 41*

The polyethylene terephthalate molding material containing glass fiber of 30% by weight based on said material, as obtained in Example 30, was used and as the additives were used (1) 1% of carbon black, based on the polyethylene terephthalate and (2) a mixture of 0.3% of talc, based on the polyethylene terephthalate and 2% of anatase type titanium dioxide, based on the polyethylene terephthalate. These two types of additives were each separately blended with the polyethylene terephthalate molding material and, after drying, were molded under identical conditions as in Example 3. The properties of the so obtained molded articles were as shown in Table XVI.

*Example 42*

Thirty parts by weight of 0.4 mm. glass fibers and 70 parts by weight of polyethylene terephthalate were mixed carefully into a homogeneous mixture, after which this mixture was dried for 3 hours at 160° C. with hot air. The thread obtained by extrusion at a cylinder temperature of 250–270° C. was cut into 5-mm. lengths. These pellets were then dried under the same conditions as given above and then compression molded. The compression molding conditions were as follows: First, the pellets were deposited in the die, then melted with a die temperature of 260–270° C. and thereafter cooled to 130° C. while applying pressure.

After allowing to stand for about 10 minutes with the pressure being still applied, the molded article was removed from the die. The properties of this molded article were practically identical to those of an article obtained by an injection molding and heat treatment operation, using these pellets.

TABLE XIV

| Example | Additive | Surface Appearance | Surface Heat Deformation By Load | Heat Deflection Temperature (264 lb./in.²), °C. | Hardness (Rockwell M) | Tensile Strength, kg./cm.² | Flexural Strength, kg./cm.² | Modulus of Elasticity, kg./cm.² | Impact Strength (⅛"), kg.-cm./cm. | Impact Strength (¼"), kg.-cm./cm. |
|---|---|---|---|---|---|---|---|---|---|---|
| 30 | Not added | Partially non-uniform semi-transparent. | Excessive | 96 | 94.0 | 1,350 | 1,920 | 80,500 | 12.7 | 15.8 |
| 31 | Graphite | Black uniformly opaque. | Slight | 235 | 99.6 | 1,300 | 1,950 | 87,200 | 12.3 | 15.3 |
| 32 | Magnesium oxide. | Pale white uniformly opaque. | ....do...... | 225 | 97.5 | 1,340 | 1,910 | 84,500 | 11.0 | 15.0 |
| 33 | Calcium sulfate. | ....do...... | ....do...... | 228 | 98.0 | 1,290 | 1,900 | 86,200 | 10.8 | 14.6 |
| 34 | Talc | ....do...... | ....do...... | 232 | 98.5 | 1,320 | 1,940 | 88,000 | 11.8 | 15.1 |
| 35 | Calcium benzoate | ....do...... | ....do...... | 228 | 98.0 | 1,310 | 1,920 | 85,000 | 11.1 | 15.0 |

TABLE XV

| Example | Additive | Surface Appearance | Surface Heat Deformation By Load | Heat Deflection Temperature (264 lb./in.²), °C. | Hardness (Rockwell M) | Tensile Strength, kg./cm.² | Flexural Strength, kg./cm.² | Modulus of Elasticity, kg./cm.² | Impact Strength (⅛"), kg.-cm./cm. |
|---|---|---|---|---|---|---|---|---|---|
| 36 | Not added | Partially non-uniform semi-transparent. | Excessive | (¹) | 94.0 | 920 | 1,350 | 72,800 | 6.0 |
| 37 | Calcium silicate | Pale white uniformly opaque. | Slight | 210 | 98.0 | 910 | 1,410 | 80,100 | 5.8 |
| 38 | Calcium oxalate | ....do...... | ....do...... | 220 | 97.8 | 915 | 1,380 | 78,500 | 6.0 |
| 39 | Graphite | Black uniformly opaque. | ....do...... | 214 | 97.5 | 920 | 1,375 | 76,900 | 5.9 |

¹ Apparent deformation 95, true deformation 200.

TABLE XVI

| Example | Additive | Surface Appearance | Surface Heat Deformation By Load | Heat Deflection Temperature (264 lb./in.²), °C. | Surface Hardness (Rockwell M) | Impact Strength (¼"), kg.-cm./cm. |
|---|---|---|---|---|---|---|
| 40 | Carbon black | Deep black uniformly opaque dispersed glass fibers, not discernible. | Slight | 233 | 99.5 | 15.3 |
| 41 | Talc plus titanium dioxide. | Deep white uniformly opaque dispersed glass fibers, not discernible. | ....do...... | 237 | 100.5 | 14.5 |

We claim:
1. A reinforced polyethylene terephthalate composition for molding use comprising polyethylene terephthalate resin, glass fibers of an average length of from 0.4 mm. to about 8 mm. in an amount of 10% to 50% by weight based on the composition, and at least one nucleating agent selected from the group consisting of carbon powders, the oxides, sulfates, phosphates, silicates, oxalates, stearates, benzoates, salicylates and tartrates of the metals of Group II of the Periodic Table and neutral clays, in an amount of at least 0.1% by weight based on said resin.

2. The composition of claim 1 wherein said nucleating agent is present in a nucleating-effecting amount of from 0.1% to 3% by weight based on the polyethylene terephthalate resin.

3. A molded article of resin forced polyethylene terephthalate, said molded article comprising polyethylene terephthalate, glass fibers of an average length of from 0.4 mm. to about 8 mm. contained in an amount of from 10% to 50% by weight, based on said article, said glass fibers being contained randomly and uniformly in said article, and at least one nucleating agent selected from the group consisting of carbon powders, the oxides, sulfates, phosphates, silicates, oxalates, stearates, benzoates, salicylates and tartrates of the metals of Group II of the Periodic Table and neutral clays, in an amount of at least 0.1% by weight based on said polyethylene terephthalate.

4. A method of producing molded articles of reinforced polyethylene terephthalate which comprises molding at a mold temperature of 120° to 200° C., a reinforced polyethylene terephthalate composition for molding use, said composition consisting of polyethylene terephthalate resin, 10% to 50% by weight, based on said composition, of glass fibers of an average length of 0.4 mm. to about 8 mm. and at least one nucleating agent selected from the group consisting of carbon powders, the oxides, sulfates, phosphates, silicates, oxalates, stearates, benzoates, salicylates and tartrates of the metals of Group II of the Periodic Table and neutral clays, in an amount of at least 0.1% by weight based on said resin.

5. A method of producing molded articles of reinforced polyethylene terephthalate which comprises molding a reinforced polyethylene terephthalate composition for molding use consisting of polyethylene terephthalate resin and 10% to 50% by weight, based on said composition, of glass fibers of an average length of 0.4 mm. to about 8 mm. and at least one nucleating agent selected from the group consisting of carbon powders, the oxides, sulfates, phosphates, silicates, oxalates, stearates, benzoates, salicylates and tartrates of the metals of Group II of the Periodic Table and neutral clays, in an amount of at least 0.1% by weight based on said resin, and thereafter heating the resulting molded article at a temperature of 120° to 200° C.

6. The method according to claim 5 wherein said heating is effected for a period of 10 to 40 minutes.

References Cited

UNITED STATES PATENTS

| 2,649,622 | 8/1953 | Piccard | 264—126 |
| 2,877,501 | 3/1959 | Bradt | 264—143 |

FOREIGN PATENTS

| 1,060,532 | 7/1959 | Germany. |

OTHER REFERENCES

Handbook of Reinforced Plastics; Society of the Plastics Industry, Inc.; 1964; pp. 105, 107, 147, 148.

Kuhre et al.: Crystallization-Modified Polypropylene; Society of Plastics Engineering Journal; October, 1964; pp. 1113–1116.

Wichterle et al.: Alkalishe Polymerization Des 6-Caprolactams IX. Einfluss von Zusatzen auf die Morphologische Struktur des Poly-6-Caprolactams; Czechoslov. Chem. Comm.; vol. 28; 1963; pp. 696–698, 701–707.

MORRIS LIEBMAN, *Primary Examiner.*

L. T. JACOBS, *Assistant Examiner.*